United States Patent
Dragan

(10) Patent No.: US 8,813,635 B2
(45) Date of Patent: Aug. 26, 2014

(54) STEAM-HEAT-ONLY, FOOD-PREPARATION BOWL STRUCTURE AND RELATED METHODOLOGY

(76) Inventor: Marinela Luminita Dragan, Portland, OR (US)

( * ) Notice: Subject to any disclaimer, the term of this patent is extended or adjusted under 35 U.S.C. 154(b) by 1009 days.

(21) Appl. No.: 12/315,827

(22) Filed: Dec. 5, 2008

(65) Prior Publication Data

US 2009/0186139 A1    Jul. 23, 2009

Related U.S. Application Data

(60) Provisional application No. 61/021,833, filed on Jan. 17, 2008.

(51) Int. Cl.
*A23L 1/01*    (2006.01)
*A47J 27/17*    (2006.01)
*A47J 43/07*    (2006.01)

(52) U.S. Cl.
CPC .............. *A23L 1/0121* (2013.01); *A47J 27/17* (2013.01); *A47J 43/0705* (2013.01)
USPC ......................................................... 99/349

(58) Field of Classification Search
USPC ................ 99/422, 277.2, 287, 288, 348, 409, 99/410–417; 219/201, 428, 443.1, 452.1, 219/452.11, 452.13, 468.1, 472, 474; 366/3, 4, 7, 22–24, 146, 147, 220, 224, 366/243, 244, 255, 279, 281, 284, 301, 341, 366/343
See application file for complete search history.

(56) References Cited

U.S. PATENT DOCUMENTS

| | | | | | |
|---|---|---|---|---|---|
| 119,169 | A | * | 9/1871 | Ogden | 126/369 |
| 1,227,935 | A | * | 5/1917 | Robertson | 366/146 |
| 1,491,991 | A | * | 4/1924 | Lacy et al. | 366/146 |
| 1,505,703 | A | * | 8/1924 | Darley | 126/376.1 |
| 1,882,127 | A | * | 10/1932 | Emmons | 366/199 |
| 2,032,571 | A | * | 3/1936 | Gilbert et al. | 366/201 |
| 2,063,692 | A | * | 12/1936 | Martinet | 366/200 |
| 2,169,323 | A | * | 8/1939 | Martinet | 241/92 |
| 2,217,266 | A | * | 10/1940 | Cookson | 202/163 |
| 2,222,390 | A | * | 11/1940 | Ackles | 118/28 |
| 2,275,901 | A | * | 3/1942 | Harwood | 219/201 |
| 2,557,622 | A | * | 6/1951 | Trier | 165/72 |
| 2,615,690 | A | * | 10/1952 | Jepson | 366/197 |

(Continued)

FOREIGN PATENT DOCUMENTS

EP          1680999 A1    7/2006

*Primary Examiner* — Henry Yuen
*Assistant Examiner* — Eric Stapleton
(74) *Attorney, Agent, or Firm* — Jon M. Dickinson, P.C.

(57) ABSTRACT

Steam-heat-only, food-preparation bowl structure and related methodology. The bowl structure includes (a) an outer bowl unit having a water well disposed adjacent its base, (b) an inner bowl unit nestable in the outer unit in a condition having its base spaced above the water well whereby water in the well does not contact the inner bowl's base, and with a generally closed, bowl-shaped void space then existing between the two units, the inner unit being constructed to receive a mixable mass of food, and (c) a controllable heater disposed within the well, operable to heat water contained therein to produce steam within the void space. The related methodology includes the steps of (a) applying mixing action to such a mass within the inner bowl unit, and while so applying, vapor-heating the mass indirectly and solely by an adjacent body of steam disposed in the void space between the units.

1 Claim, 2 Drawing Sheets

(56) References Cited

U.S. PATENT DOCUMENTS

| | | | | |
|---|---|---|---|---|
| 2,648,514 A | * | 8/1953 | Rosier et al. | 248/131 |
| 2,681,211 A | * | 6/1954 | Reynolds | 366/251 |
| 2,707,622 A | * | 5/1955 | Vance | 366/199 |
| 2,867,420 A | * | 1/1959 | Potts | 366/146 |
| 2,896,924 A | * | 7/1959 | Jepson | 241/101.1 |
| 2,905,452 A | * | 9/1959 | Appleton | 366/199 |
| 2,931,232 A | * | 4/1960 | Martin | 74/16 |
| 3,282,468 A | * | 11/1966 | Karlen | 222/67 |
| 3,528,401 A | * | 9/1970 | Moore | 126/369 |
| 3,635,147 A | * | 1/1972 | Lee | 99/348 |
| 3,779,447 A | | 12/1973 | Bemiss | |
| 3,783,770 A | * | 1/1974 | Aries | 99/348 |
| 3,827,677 A | * | 8/1974 | Meyerhoefer et al. | 366/282 |
| 3,856,220 A | * | 12/1974 | Waters | 241/282.1 |
| 3,951,351 A | * | 4/1976 | Ernster et al. | 241/101.1 |
| 4,148,250 A | | 4/1979 | Miki et al. | |
| 4,181,239 A | | 1/1980 | Heiremans et al. | |
| 4,222,493 A | * | 9/1980 | Friedman | 220/8 |
| 4,258,695 A | * | 3/1981 | McCarton et al. | 126/375.1 |
| 4,262,374 A | * | 4/1981 | Mikiya et al. | 4/537 |
| 4,267,928 A | | 5/1981 | Curry, Jr. | |
| 4,282,984 A | | 8/1981 | Curry, Jr. | |
| 4,339,307 A | * | 7/1982 | Ellis, Jr. | 202/176 |
| 4,397,298 A | * | 8/1983 | Abell | 126/369 |
| 4,417,506 A | * | 11/1983 | Herbst et al. | 99/348 |
| 4,435,084 A | * | 3/1984 | Calhoun et al. | 366/130 |
| 4,462,308 A | * | 7/1984 | Wang | 99/413 |
| 4,509,412 A | * | 4/1985 | Whittenburg et al. | 99/331 |
| 4,555,616 A | * | 11/1985 | O'Brien | 219/432 |
| 4,574,776 A | * | 3/1986 | Hidle | 126/369 |
| 4,583,863 A | * | 4/1986 | Pandolfi | 366/311 |
| 4,613,086 A | * | 9/1986 | Granum et al. | 241/101.8 |
| 4,650,968 A | * | 3/1987 | Williams | 219/401 |
| 4,702,608 A | * | 10/1987 | Garbar et al. | 366/146 |
| 4,704,035 A | * | 11/1987 | Kowalczyk | 366/142 |
| 4,766,766 A | * | 8/1988 | Ahlert et al. | 73/169 |
| 4,790,667 A | * | 12/1988 | Pardo et al. | 366/311 |
| 4,802,407 A | * | 2/1989 | Negri et al. | 99/453 |
| 4,907,502 A | * | 3/1990 | Snyder, Jr. | 99/455 |
| 4,922,079 A | * | 5/1990 | Bowen et al. | 219/415 |
| 4,964,333 A | * | 10/1990 | Bravo | 99/455 |
| 4,993,593 A | * | 2/1991 | Fabiano et al. | 222/1 |
| 5,022,315 A | * | 6/1991 | Bertram et al. | 99/348 |
| 5,045,369 A | | 9/1991 | Kobayashi et al. | |
| 5,048,402 A | * | 9/1991 | Letournel et al. | 99/348 |
| 5,092,229 A | * | 3/1992 | Chen | 99/337 |
| 5,097,753 A | * | 3/1992 | Naft | 99/341 |
| 5,114,572 A | * | 5/1992 | Hunter et al. | 210/120 |
| 5,228,384 A | * | 7/1993 | Kolosowski | 99/342 |
| 5,235,904 A | * | 8/1993 | Ludena | 99/413 |
| 5,275,094 A | * | 1/1994 | Naft | 99/416 |
| 5,287,798 A | * | 2/1994 | Takeda | 99/413 |
| 5,363,746 A | * | 11/1994 | Gordon | 99/328 |
| 5,363,747 A | * | 11/1994 | Clark et al. | 99/348 |
| 5,366,103 A | * | 11/1994 | Abernathy et al. | 220/23.83 |
| 5,400,700 A | * | 3/1995 | Bois | 99/403 |
| 5,400,701 A | * | 3/1995 | Sham | 99/410 |
| 5,415,082 A | * | 5/1995 | Nagao | 99/403 |
| 5,441,169 A | * | 8/1995 | Petty | 220/573.4 |
| 5,460,289 A | * | 10/1995 | Gemmell | 220/495.02 |
| 5,495,795 A | * | 3/1996 | Harrison et al. | 99/492 |
| RE35,283 E | * | 6/1996 | Helmich | 202/176 |
| 5,524,530 A | * | 6/1996 | Nijzingh et al. | 99/492 |
| 5,525,781 A | * | 6/1996 | Yahav et al. | 219/620 |
| 5,584,235 A | * | 12/1996 | DuBois et al. | 99/413 |
| 5,613,774 A | * | 3/1997 | Chandra et al. | 366/228 |
| 5,615,951 A | * | 4/1997 | Gabriele | 366/311 |
| 5,653,161 A | * | 8/1997 | Nopanen et al. | 99/415 |
| 5,794,524 A | * | 8/1998 | Kemker et al. | 99/348 |
| 5,794,525 A | * | 8/1998 | Fan | 99/413 |
| 5,799,567 A | * | 9/1998 | Dorner | 99/348 |
| 5,834,739 A | * | 11/1998 | Lockwood et al. | 219/468.1 |
| 5,865,104 A | * | 2/1999 | Sham et al. | 99/417 |
| 5,911,505 A | * | 6/1999 | St. John et al. | 366/200 |
| 5,974,953 A | * | 11/1999 | Messerli | 99/340 |
| 5,992,307 A | * | 11/1999 | Parker et al. | 99/417 |
| 6,026,735 A | * | 2/2000 | Waterworth | 99/348 |
| 6,055,901 A | * | 5/2000 | Gantos et al. | 99/412 |
| 6,089,143 A | * | 7/2000 | Figueroa | 99/327 |
| 6,125,738 A | * | 10/2000 | Poister | 99/339 |
| 6,230,612 B1 | * | 5/2001 | Rossi | 99/446 |
| 6,267,046 B1 | * | 7/2001 | Wanat | 99/332 |
| 6,318,247 B1 | * | 11/2001 | Di Nunzio et al. | 99/348 |
| 6,359,268 B1 | * | 3/2002 | Walter | 219/622 |
| 6,401,599 B1 | * | 6/2002 | Maeda et al. | 99/327 |
| 6,474,222 B1 | * | 11/2002 | Pretre | 99/331 |
| 6,516,709 B1 | * | 2/2003 | Lin | 99/348 |
| 6,571,564 B2 | * | 6/2003 | Upadhye et al. | 62/3.3 |
| 6,629,491 B1 | * | 10/2003 | Chan | 99/331 |
| 6,640,692 B1 | * | 11/2003 | Hilgers et al. | 99/348 |
| 6,758,363 B2 | | 7/2004 | Stokes | |
| 6,805,312 B2 | * | 10/2004 | Capp | 241/36 |
| 7,011,013 B2 | * | 3/2006 | Leason | 99/339 |
| 7,166,822 B1 | * | 1/2007 | Chang et al. | 219/521 |
| 7,231,872 B2 | * | 6/2007 | Babicz | 99/455 |
| 8,166,871 B2 | * | 5/2012 | Veltrop et al. | 99/410 |
| 2003/0146224 A1 | | 8/2003 | Fujii et al. | |
| 2004/0045973 A1 | | 3/2004 | Stokes | |
| 2004/0065211 A1 | * | 4/2004 | McNair | 99/348 |
| 2004/0194636 A1 | * | 10/2004 | Huang et al. | 99/348 |
| 2005/0132896 A1 | * | 6/2005 | Seurat Guiochet et al. | 99/337 |
| 2006/0044935 A1 | * | 3/2006 | Benelli et al. | 366/145 |
| 2007/0095836 A1 | | 5/2007 | Auwarter et al. | |

* cited by examiner

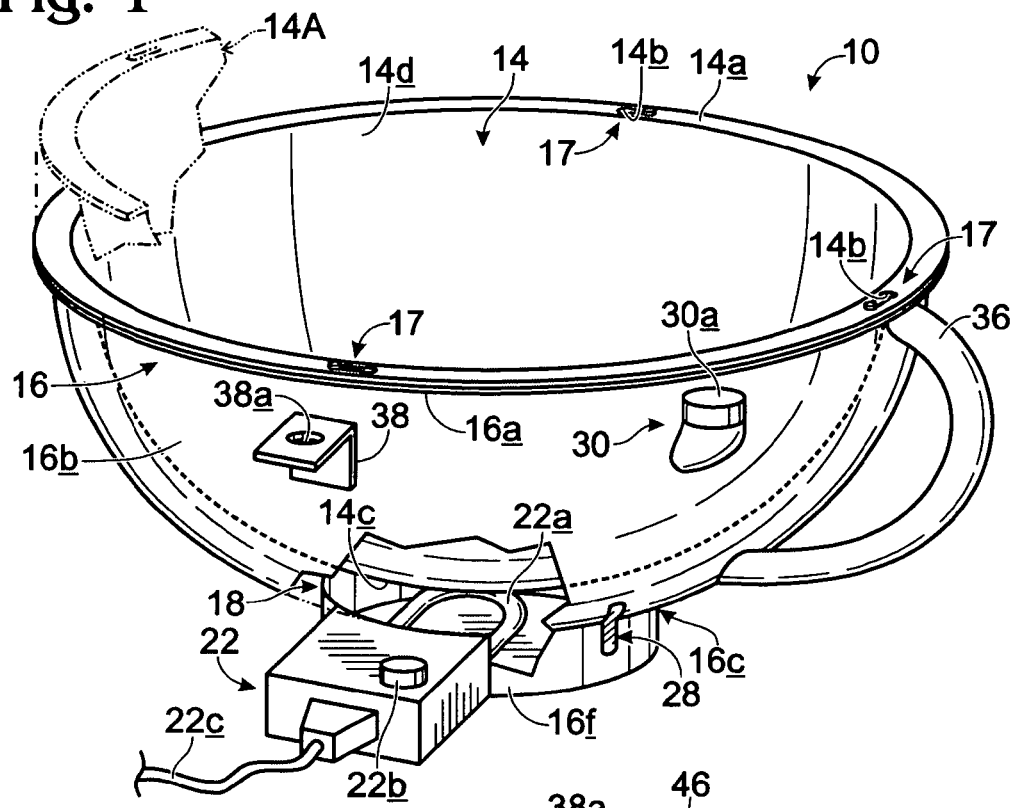
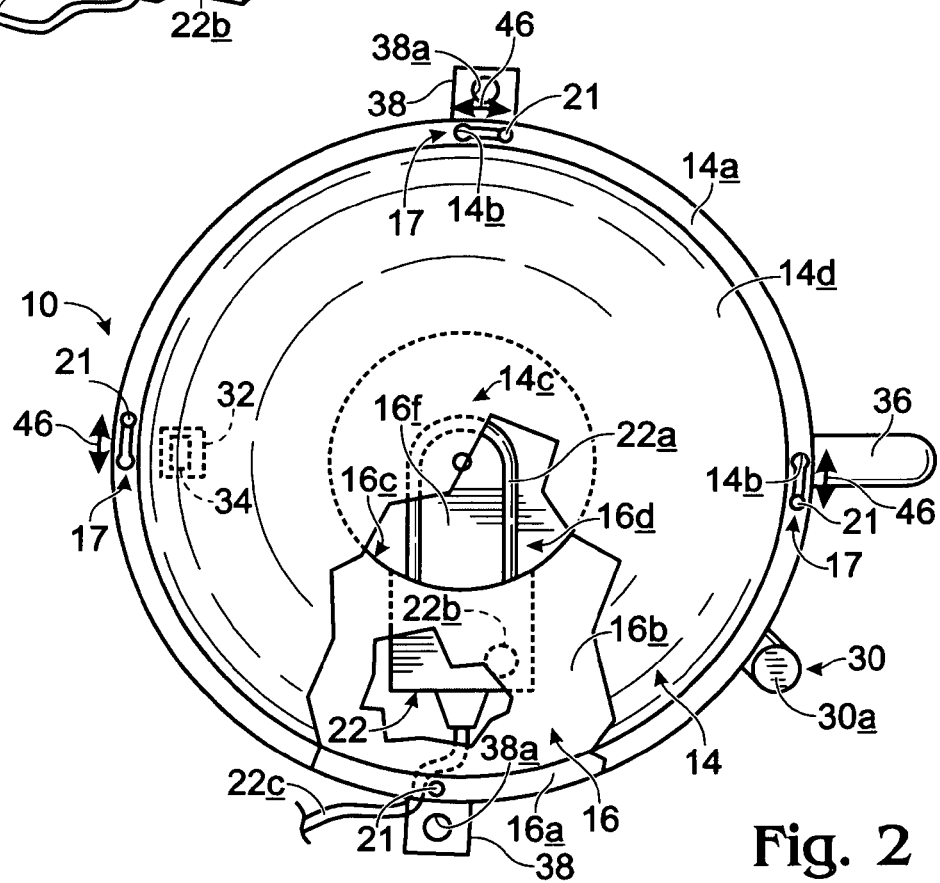

US 8,813,635 B2

STEAM-HEAT-ONLY, FOOD-PREPARATION BOWL STRUCTURE AND RELATED METHODOLOGY

CROSS-REFERENCE TO RELATED APPLICATION

This application claims filing-date priority to previously filed U.S. Provisional Patent Application No. 61/021,833, filed Jan. 17, 2008, for "Liquid-Filled Double-Walled Temperature-Controlled Mixing Bowl". The entire disclosure content of that Provisional Patent Application is hereby incorporated herein by reference.

BACKGROUND AND SUMMARY OF THE INVENTION

This invention pertains to food-preparation bowl structure, such as food-mixing bowl structure, and to related methodology. In particular, it relates to such structure and methodology wherein heat may be applied during the preparation/mixing process for the purpose of heating, and even partially (or fully) cooking, food which is being mixed. Even more particularly, the invention focuses on this kind of bowl structure and methodology wherein inner and outer, nestable bowl units are included and employed which may be disconnectably joined to form a bowl-shaped void space between them wherein heated steam alone, during use of the bowl structure, is introduced under control to furnish extremely stable, uniform heat to the outside surface of the inner bowl unit, and through the heat-conductive wall of that inner unit to any contained mixable/mixed food.

For the purpose of illustration herein, a preferred and best-mode embodiment of, and manner of practicing, the invention are described in the setting of bowl structure of the type generally outlined above which is especially suited to function as a removable attachment to an otherwise conventional food mixer of the kind having a power-driven, orbital/rotary-implement-carrying mixing "head".

In structural terms which significantly affect the unique methodology of the invention, while the bowl structure of the present invention offers a number of interesting and unique features, standing out among them is the fact that this structure, as a whole, effectively permits only controlled steam heating of a nested, inner bowl unit. This steam-heating-only feature and practice of the invention is accommodated, in the herein disclosed preferred embodiment, etc. of the invention, by the presence, adjacent the base of the outer bowl unit, of an upwardly facing, open-topped well which includes a controllable electrical heating unit, or element, and which is designed to hold a body of "to-steam-heatable" water in a location, and with a disposition, which keeps the upper reaches of this water away from direct contact with the inner bowl unit.

These and various other features and advantages of the invention will become more fully apparent as the detailed description thereof which follows below is read in conjunction with the accompanying drawings.

DESCRIPTIONS OF THE DRAWINGS

FIG. 1 is a top, isometric view, with small portions broken away to reveal details of construction, of food-preparation bowl structure constructed and operable in accordance with a preferred and best-mode embodiment (structure and methodology) of the present invention. Shown fragmentarily in this drawing figure, in dash-double-dot lines, is a slightly lifted, moved-position illustration of an inner bowl unit relative to an outer bowl unit which collectively form portions of the bowl structure of the present invention.

FIG. 2 is a top, plan view taken from the upper side of FIG. 1, again with certain portions broken away to reveal details of construction, of the overall bowl structure which is pictured in FIG. 1.

Figure 3:
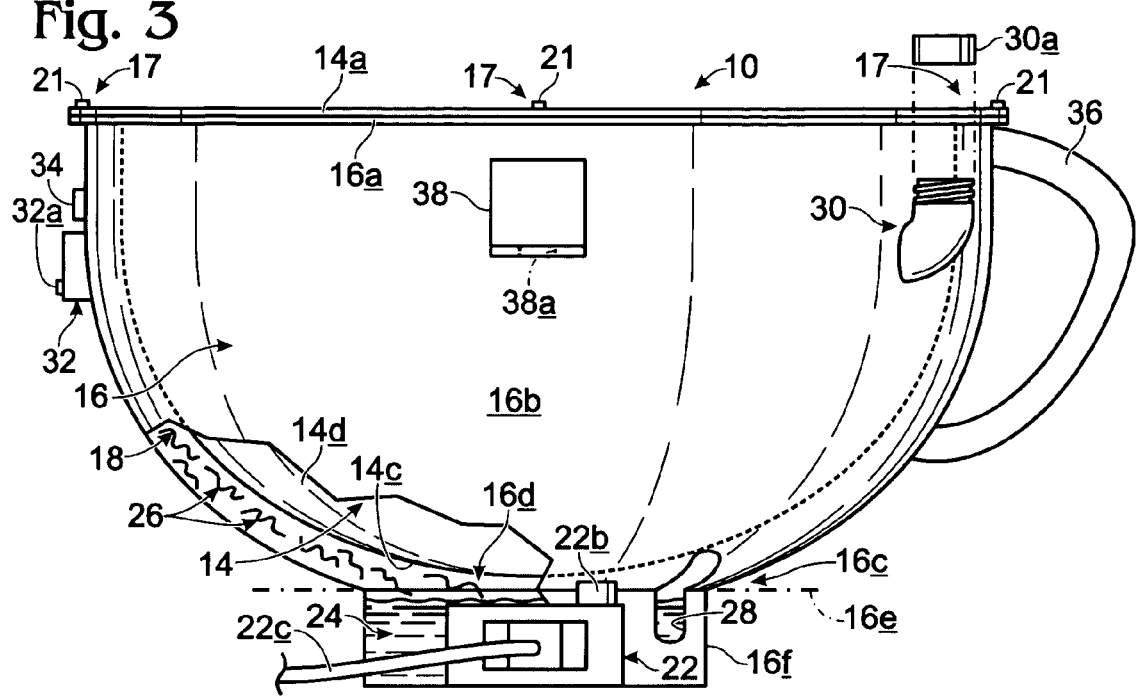
FIG. 3 is a side elevation, also with portions broken away to reveal details of construction, of the bowl structure pictured in FIGS. 1 and 2.
Figure 4:
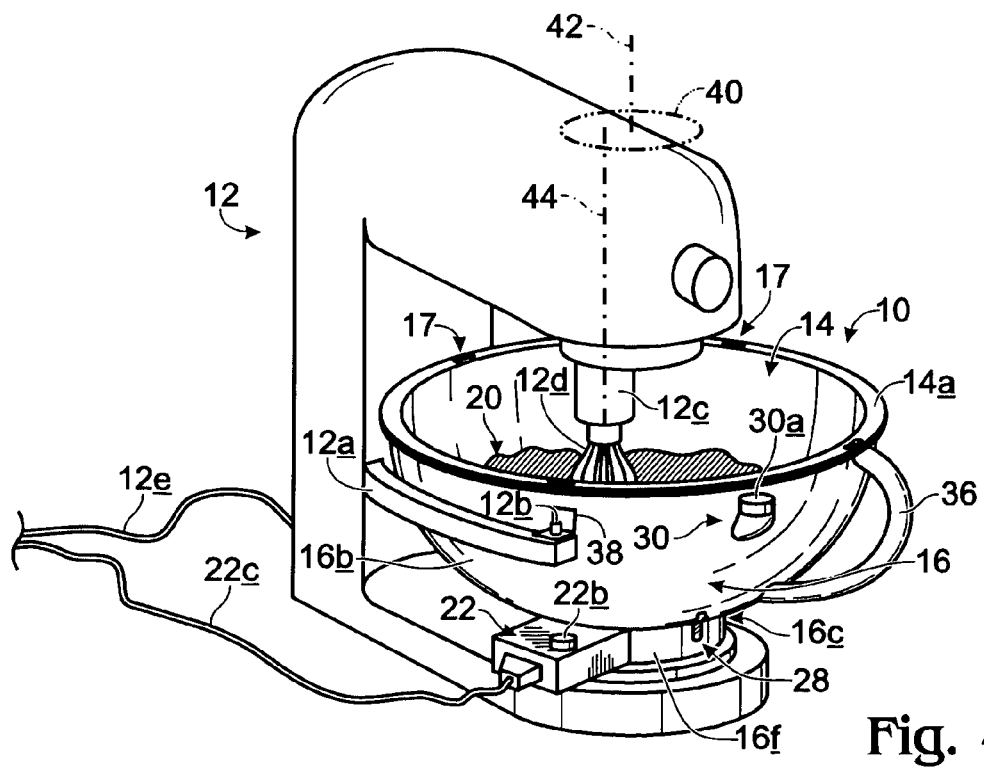

FIG. 4 is a top isometric view of the bowl structure of FIGS. 1-3, inclusive, shown positioned in place as a removable attachment for use in conjunction with a conventional, lift-stand style, orbital/rotary-implement food mixer of the type which includes an orbital/rotary implement-carrying, power-driven mixing head shown carrying a representative mixing implement. In FIG. 4, the just-mentioned mixing implement extends downwardly into the inner bowl unit of the bowl structure of the present invention.

DETAILED DESCRIPTION OF THE INVENTION

Turning attention now to the drawings, indicated generally at 10 is what is referred to herein as a steam-heat-only, dual-bowl-unit, bowl-perimeter-rim-engaging, food-preparation bowl structure constructed and methodologically operable in accordance with a preferred and best-mode embodiment of, and manner of practicing, the present invention. Bowl structure 10 herein is constructed to function as a removable attachment for, and thus to be usable with, a conventional, lift-stand-type, orbital/rotary-implement food mixer, such as the food mixer shown generally at 12 in FIG. 4. More will be said about mixer 12, and about the working relationship between bowl structure 10 and mixer 12 in a representative practice of the invention, shortly.

Describing the relevant structure of the invention, bowl structure 10 includes an inner, food-reception bowl unit 14, and an outer, steam-handling bowl, or steam, unit 16. These two, individual bowl units, as will become more fully apparent, and as can be observed clearly in the drawings, are reversibly, relatively nestable (inner unit within outer unit) with respect to one another. In solid lines in all of the drawing figures, the two bowl units are shown in such a nested condition, and specifically in what is referred to herein as an interengaged, rim-to-rim seated, rim-locked, nested condition. In dash-double-dot lines at 14A in FIG. 1, inner unit 14 is pictured, fragmentarily, in a slightly lifted, un-nested condition above outer unit 16.

Inner bowl unit 14, which is generally hemispherical in shape, includes an upper, laterally outwardly projecting, annular, perimetral rim 14a in which, at four quadrature-disposed locations, there are formed key-shaped slots (also called key-slots herein), such as the two such slots shown at 14b. Slots 14b each forms a portions of a bayonet-type, releasable locking structure, such as those locking structures shown generally at 17, more about which will be described shortly. The inner bowl unit also includes a base 14c, referred to herein additionally as a continuity base region, which is formed as a continuity portion of a compoundly curved wall 14d whose inner and outer sides define the inner and outer sides, respectively, of bowl unit 14. Wall 14d, and indeed the entirety of bowl unit 14, is preferably formed of a suitable, relatively thin-walled, heat-conductive material, such as stainless steel. This material preferably is also one which is relatively easily cleaned, inasmuch as it is intended that, during use of the bowl structure of this invention with respect to previously mentioned mixer 12, a mass of food, such as that very generally illustrated at 20 in FIG. 4, will be steam-heated and mixed.

Outer bowl, or steam, unit 16, which is also generally, but only partly, hemispherical in shape, includes an upper, laterally outwardly projecting, annular, perimetral rim 16a, downwardly from which extends a generally, partially hemispherical wall 16b which is also referred to herein as a compoundly curved continuity portion of unit 16. Located adjacent the base of wall 16b, and forming a part of the base of bowl unit 16, is a central, generally circular base region 16c which is defined by a central, generally circular, planar void expanse, or opening, 16d (see FIGS. 2 and 3), which void expanse/opening lies in a plane 16e (see FIG. 3). As will be more fully explained, wall 16b forms at least a part of what is referred to herein as a generally hemispherical, continuity, void space, or steam-reception cavity, 18. Also forming a part of the base of bowl unit 16 is a generally cylindrical, open-topped well 16f whose open top is defined by previously mentioned, central, circular, and generally planar, void expanse/opening 16d. As can be seen, the diameter of well 16f is considerably smaller than the inside diameter of previously mentioned rim 16a.

Preferably, the outer bowl unit, or at least wall 16b in this unit, is made of a substantially non-heat-conductive material.

Projecting upwardly from rim 16a, at four quadrature locations distributed around this rim, are small, cylindrical pins 21. Pins 21, adjacent their bases which are immediately above the upper surface of rim 16a, possess circumferential grooves which, together with the remaining, upwardly projecting portions of the pins, function as the other portions of previously mentioned releasable locking structures 17. Because of the particular scales which have been chosen for use in the four drawing figures presented herein, these just-mentioned, circumferential grooves are not specifically shown and/or highlighted in the drawing figures. Pins 21, in a manner well known with respect to the operation of conventional bayonet-type connecting structure, cooperate with key-slots 14b to furnish the previously mentioned rim-lockable interengagement which is producible reversibly between bowl units 14, 16.

In all of the drawing figures herein, the two bowl units are shown in solid lines in a nested, releasably, bayonet-style, rim-locked condition.

Looking particularly at FIGS. 1-3, inclusive, with the inner and outer bowl units nested as shown, there exists between them a generally closed, bowl(generally hemispherical)-shaped void space which is the previously referred to steam-reception cavity 18. This cavity is also spoken of herein, in relation to its being created by the nested condition of the two bowl units, as taking the form of a complementary continuity void space which defines, relative to the respective bases 14c, 16c of the two bowl units, a condition called spaced, base proximity.

Suitably joined to a side of well 16f is a controllable AC heater 22 which includes a heating element 22a that extends into the interior of well 16f, a controller 22b which allows for an adjustment to be made by a user in the amount of heat generated within well 16e by element 22a, and a conventional AC power cord 22c.

During use of structure 10, well 16f is intended to be filled with, and to contain, water approximately to (and at) the level of previously mentioned plane 16e, so that, with energizing of heating element 22a, steam will be generated to flow upwardly into and fill steam-reception cavity 18. In FIG. 3, a body of water in this well is shown generally at 24 at an appropriate volume and upper level, and a body of steam which has been generated in the manner just generally described is shown in cavity 18 by wavy lines 26 in this figure.

A window 28, which is formed, generally as illustrated, adjacent the base of bowl unit 16, functions herein as a well water-level indicator. Any suitable shape, location, and manner of water-sealing may be employed for this window.

An appropriate inlet for introducing water into well 16f in unit 14 when the two bowl units are nested is shown a generally at 30—this inlet including a selectively removable closure cap 30a. Cap 30a may be manipulated during use of the bowl units in their nested condition to introduce additional water as needed to maintain an appropriate water level in well 16f.

Completing a description now of bowl structure 10, and of other things pictured in the four drawing figures, suitably joined to the outside of outer bowl unit 16 are a conventional steam-pressure relief structure (a valve structure) 32 having a user-settable, pressure-sensitivity adjuster 32a, a conventional steam-temperature gauge 34, a manipulation handle 36, and a pair of diametrally disposed, outwardly projecting food-mixer attachment ears 38 including upwardly-facing throughbores 38a. Structure 32 and gauge 34 herein, which, as mentioned, are conventional in nature, are illustrated only in simplified block forms. Pressure-relief structure is settable to relieve pressure in cavity 18 when that pressure reaches a predetermined pressure value Throughbores 38a in ears 38 are designed and configured to be compatible with, and to allow for removable mounting, or attachment, of structure 10 as a whole on, upwardly projecting capture-pins 12a that are carried (one each) on a pair of laterally spaced stand support arms 12b provided as seen in mixer 12.

Focusing for a moment specifically on FIG. 4, additionally included in mixer 12 is an orbital/rotary-implement mixing head 12c which, as illustrated in this figure, carries a user-selected mixing implement 12d. An AC power cord 12e supplies operating power to the mixer.

When mixer 12 is operated, mixing head 12c orbits in a circular path represented by dash-double-dot line 40, which path centers about an upright axis illustrated by dash-dot line 42. Such orbiting/revolving head-12c movement is delivered directly into mixing implement 12d, and a motor within this head simultaneously causes implement 12d to rotate about another upright axis which is pictured by dash-dot line 44 at a user-selected speed. This action, of course causes the rotating/revolving mixing implement to travel in an endless circular path around the inside of inner bowl unit 14 in bowl structure 10 to effect mixing of any food mass, such as food mass 20, which is contained within the inside of the inner bowl unit.

Describing now more specifically one, representative manner of using bowl structure 10 in a practice of the methodology of the present invention, typically, with the two bowl units separated, and free-standing away from a mixer, such as the mixer 12, water is poured into the outer mixing bowl unit to fill the well therein to a level much like that which is illustrated in FIG. 3. Importantly, this water-filling action is performed so as to be certain that the water level does not rise above plane 16e. This will importantly assure that, when the two bowl units are nested, water will not contact the base of inner bowl unit 14.

The inner bowl unit is then either first filled with a selected food mass which is to be heated and mixed, or alternatively first lowered into the outer bowl unit, nested within this unit, and then releasably rim-locked employing locking structures 17. Such rim locking (and later unlocking) is accomplished with the rims in contact with one another, with pins 21 disposed within key-slots 14b, and with relative rotation in the appropriate direction effected between the two bowl units, as indicated generally by the three, short, double-headed arrows pictured at 46 in FIG. 2.

The user at this point will typically, using controller 22b, select an appropriate heating temperature for the water which has been introduced into well 16f, and will operate adjuster 32a to select a steam-pressure relief value.

The assembled bowl structure is then removeably placed as shown in FIG. 4 on support arms 12b in mixer 12, with capture pins 12a received freely within throughbores 38a in ears 38, power is supplied to heater structure 22 to heat heating element 22a, and at the appropriate time as selected by the user, the mixer is turned on to begin a mixing action.

Appropriate operation of the heating element causes a body of steam, such as that shown at 26 in FIG. 3 to flow into and fill cavity 18, with this body (or fill) of steam then appropriately, indirectly heating the contained food mass within the inner bowl unit 14 through heat-conductive unit wall 14d.

Throughout the mixing and heating process whose initiation has just been described, the user, by observing water level through window 28, will add water as necessary to maintain an appropriate water level for the continued generation of steam within cavity 18, making certain that such water filling does not cause the level of water per se to make contact with the base of the inner bowl unit 14. By maintaining this control over water level so that only heated steam is employed through the wall of inner bowl unit 14 to heat the contained food mass, I have found that an extremely effective, very even, and quite controllable food-mass heating (and even cooking in certain instances) takes place. If water which is heated adjacent the base of the bowl structure comes in contact with the base of the inner bowl unit, there occurs a distinct, differential transfer of heat to food within the inside of the inner bowl unit, a heat transfer which is distinguished for food portions which are in contact with that part of the inner bowl unit which is in contact with heated in relation to food portions which are, rather, only exposed to the body of the heated steam. This differentiation can result, ultimately, in nonuniformly heat-processed, mixed food.

From a practice point of view, the invention may be described as a method for preparing a mass of mixable food which includes the steps of (a) applying mixing action to such a mass, and (b), while so applying, vapor-heating the mass indirectly and solely by an adjacent body of steam. This concept of "indirect" heating reflects the fact that heated steam supplies heat to a food mass through an appropriate heat-conductive barrier, such as the herein described wall of inner bowl unit 14.

The invention methodology may further be described as including, prior to the just above-mentioned applying step, (a) placing the food mass inside a bowl having a heat-conductive wall, (b) thereafter performing the mentioned applying step within the inside of the bowl, and (c) while so performing, carrying out the vapor-heating step by steam-bathing the outer side of the bowl's wall.

The proposed structure of the present invention is obviously relatively simple in construction, and therefore easily manufactured at a relatively low cost. Through the choice of appropriate materials for the various components of the invention, those components, following each successive use of the invention structure, may easily and quickly be properly cleaned for a next successive use.

Additionally, a user of the bowl structure of this invention is afforded a great deal of control over a food-mixing and heating (including cooking) procedure in terms of (a) monitoring appropriate steam-generating water level, (b) monitoring steam temperature within the steam-reception cavity, (c) controlling the pressure at which any desired overpressure relief may be furnished to the steam-reception cavity, and (d) adjusting the power level of operation of the heating element which is employed to generate processing steam from water in the water well.

Accordingly, while a preferred and best-mode embodiment of, and manner of practicing, the present invention have been described and illustrated herein, it is appreciated that variations and modifications may come to the minds of those generally skilled in the art exposed to the disclosure of this invention, and it is intended that all such variations and modifications will be understood to be within the realm of the scope and the spirit of the present invention.

I claim:

1. An atmospheric-pressure, steam-heat-only, food mixing combination comprising a lift-stand-type, orbital/rotary-implement food mixer having (a) a stand with support arms, and (b) an orbital mixing head which is designed to carry a rotary mixing implement while orbiting in a circular path during operation of the mixer, an outer bowl having an open top, a base with a base region, a compoundly curved wall joining with said base and possessing inner and outer sides, and an upper, laterally outwardly projecting, annular, perimetral rim, outwardly projecting ears joined to the outer side of the wall in said outer bowl accommodating removable attachment of the outer bowl to said support arms in said mixer, an inner, food reception bowl having (a) an open top, (b) a compoundly curved wall possessing inner and outer sides and a central continuity base region, and (c) an upper, laterally outwardly projecting, annular, perimetral rim, said inner bowl being removeably nestable within said outer bowl in an interengaged, rim-to-rim seated condition, and in a manner whereby the walls in said bowls are spaced from one another in a condition defining between them a closed, bowl-shaped steam-reception cavity which surrounds the entire of the outer side of the wall in said inner bowl, including the inner bowl's said continuity base region, the open top of said inner bowl accommodating orbiting, within the inner bowl, of any rotating mixing implement carried by said mixing head, under circumstances with (1) the outer and inner bowls nested, (2) the outer bowl attached to said support arms, and (3) the mixer operating, steam-pressure-relief structure operatively connected to said outer bowl for relieving steam pressure in said cavity when such pressure reaches a predetermined pressure value, a cylindrical well with an open circular top, formed centrally in the base of, and opening through the well's said open top to the inner side of the wall in, said outer bowl, structured to hold water up to the well's said open top, whereby, under circumstances with the bowls nested, the open top of said well, and any water held within the well up to the well's said open top, are disposed beneath said cavity, with any water which is then held within the inside of said well thus being out of contact with the continuity base region of said inner bowl, and a heating element disposed within said well, operable, with the bowls nested, to generate steam within said cavity by heating any water then held in the well.

* * * * *